(12) United States Patent
Brennan

(10) Patent No.: US 10,300,659 B2
(45) Date of Patent: May 28, 2019

(54) MATERIAL DEPOSITION SYSTEM FOR ADDITIVE MANUFACTURING

(71) Applicant: Raytheon Company, Waltham, MA (US)

(72) Inventor: Michael Brennan, Mckinney, TX (US)

(73) Assignee: Raytheon Company, Waltham, MA (US)

( * ) Notice: Subject to any disclaimer, the term of this patent is extended or adjusted under 35 U.S.C. 154(b) by 246 days.

(21) Appl. No.: 15/190,480

(22) Filed: Jun. 23, 2016

(65) Prior Publication Data
US 2017/0368739 A1 Dec. 28, 2017

(51) Int. Cl.
*B29C 64/106* (2017.01)
*B29C 64/20* (2017.01)
(Continued)

(52) U.S. Cl.
CPC ........... *B29C 64/106* (2017.08); *B29C 47/04* (2013.01); *B29C 47/122* (2013.01);
(Continued)

(58) Field of Classification Search
CPC ... B29C 47/0014; B29C 47/04; B29C 47/122; B29C 47/128; B29C 64/106;
(Continued)

(56) References Cited

U.S. PATENT DOCUMENTS

| 4,043,720 A | * | 8/1977 | Mercer | ................... B29C 47/02 425/113 |
| 5,529,652 A | | 6/1996 | Asai et al. | |

(Continued)

FOREIGN PATENT DOCUMENTS

| CN | 103240883 A | 8/2013 |
| EP | 2 191 956 A1 | 6/2010 |

(Continued)

OTHER PUBLICATIONS

Definition of Strand_Apr. 12, 2016 (Year: 2016).*

(Continued)

*Primary Examiner* — Matthew J Daniels
*Assistant Examiner* — Yunju Kim
(74) *Attorney, Agent, or Firm* — Renner Otto

(57) ABSTRACT

A material deposition system for additive manufacturing including an extruder that defines a first input passage for supplying a first material, a second input passage for supplying a second material, a chamber for combining the first and second materials to form a combined deposition material, and an extrusion port for extruding the combined deposition material. The system further includes an adjustable sleeve that is movable between a first position and a second position to vary the interaction between the first material and the second material in the chamber. For example, the adjustable sleeve may be configured to separate the first and second materials in the chamber, and can vary the point at which the materials interface with each other prior to deposition based on the sleeve position. Such a system may enable a varying degree of infiltration, encapsulation, or other interaction between the first and second materials prior to deposition.

15 Claims, 3 Drawing Sheets

(51) Int. Cl.
  *B29C 64/386* (2017.01)
  *B33Y 50/02* (2015.01)
  *B33Y 30/00* (2015.01)
  *B33Y 10/00* (2015.01)
  *B29C 64/00* (2017.01)
  *B29C 47/04* (2006.01)
  *B29C 47/12* (2006.01)
  *B29C 47/92* (2006.01)
  *B29C 47/00* (2006.01)
  *B29C 47/06* (2006.01)
  *B29C 47/08* (2006.01)
  *B29C 47/86* (2006.01)

(52) U.S. Cl.
  CPC ............ *B29C 47/128* (2013.01); *B29C 47/92* (2013.01); *B29C 64/20* (2017.08); *B29C 64/386* (2017.08); *B33Y 10/00* (2014.12); *B33Y 30/00* (2014.12); *B33Y 50/02* (2014.12); *B29C 47/0002* (2013.01); *B29C 47/0014* (2013.01); *B29C 47/0066* (2013.01); *B29C 47/065* (2013.01); *B29C 47/0828* (2013.01); *B29C 47/0866* (2013.01); *B29C 47/862* (2013.01); *B29C 64/00* (2017.08); *B29C 2793/0027* (2013.01); *B29C 2947/926* (2013.01); *B29C 2947/92704* (2013.01); *B29C 2947/92904* (2013.01)

(58) Field of Classification Search
  CPC ..... B29C 64/20; B29C 64/386; B29C 47/025; B29C 47/027; B29C 47/1045; B29C 67/00; B29C 64/118; B33Y 10/00; B33Y 30/00; B33Y 50/02; B29F 3/10

USPC ............. 264/308, 171.13; 425/113, 114, 375
  See application file for complete search history.

(56) References Cited

U.S. PATENT DOCUMENTS

| | | |
|---|---|---|
| 5,936,861 A | 8/1999 | Jang et al. |
| 6,934,600 B2 | 8/2005 | Jang et al. |
| 8,147,739 B2 * | 4/2012 | Castiglioni ............. B29C 47/92 |
| | | 264/171.13 |
| 8,827,684 B1 | 9/2014 | Schumacher et al. |
| 9,126,365 B1 | 9/2015 | Mark et al. |
| 9,126,367 B1 | 9/2015 | Mark et al. |
| 9,149,988 B2 | 10/2015 | Mark et al. |
| 9,156,205 B2 | 10/2015 | Mark et al. |
| 9,186,846 B1 | 11/2015 | Mark et al. |
| 9,186,848 B2 | 11/2015 | Mark et al. |
| 2013/0209600 A1 * | 8/2013 | Tow .................... G01N 35/1011 |
| | | 425/375 |
| 2014/0061974 A1 | 3/2014 | Tyler |
| 2014/0287139 A1 | 9/2014 | Farmer et al. |
| 2016/0263822 A1 * | 9/2016 | Boyd, IV ............ B29C 67/0055 |
| 2016/0311165 A1 * | 10/2016 | Mark .................... B33Y 10/00 |

FOREIGN PATENT DOCUMENTS

| | | |
|---|---|---|
| WO | 2015/028809 A1 | 3/2015 |
| WO | 2016/077473 A1 | 5/2016 |

OTHER PUBLICATIONS

International Search Report and Written Opinion for corresponding International Application No. PCT/US2017/014537 dated Apr. 25, 2017.

* cited by examiner

MATERIAL DEPOSITION SYSTEM FOR ADDITIVE MANUFACTURING

FIELD OF INVENTION

The present invention relates generally to additive manufacturing, and more particularly to a material deposition system for forming a three-dimensional object by additive manufacturing.

BACKGROUND

Additive manufacturing is a rapidly growing technology that is used to create reasonably accurate three-dimensional objects. Current additive manufacturing techniques, such as fused-filament fabrication (FFF), are typically accomplished by forcing a polymer filament through a heated nozzle in an extrusion printhead, where the polymer feedstock is liquefied before or as it passes through the nozzle, and the feed pressure causes the material to be extruded through an exit orifice in the nozzle. The material exiting the nozzle is typically deposited in layers, and a certain number of layers are laid down in a particular arrangement to eventually form the three-dimensional object.

SUMMARY OF INVENTION

Existing additive manufacturing systems of the type described above typically use a single extrusion printhead that extrudes a single filament of thermoplastic material. Some other known additive manufacturing systems have multiple inlet ports for receiving multiple filaments that may be extruded through separate outlet ports simultaneously. However, such known additive manufacturing systems do not have the ability to vary the exposure time and/or other interaction of one material with another material within a chamber of an extrusion printhead for enhancing the tailorability of the additively manufactured object, or for improving the flexibility in the additive manufacturing process.

An aspect of the present invention provides, inter alia, a material deposition system for additive manufacturing that includes an adjustable sleeve within a chamber of an extrusion head, where the adjustable sleeve can vary the interaction between two or more materials in the chamber. For example, the adjustable sleeve may be configured to vary the point at which the two or more materials combine with each other in the chamber, which may enable a varying degree of infiltration, encapsulation, or other interaction between the materials prior to being deposited.

More particularly, the adjustable sleeve may be configured to separate a first material from a second material within a chamber of the extrusion head, and the sleeve may be movable within the chamber between a first position and a second position to vary the exposure time of the second material with the first material based on the position of the sleeve within the chamber.

For example, when the sleeve is in the first position, the at least two materials may interface and combine with each other further upstream from the point of extrusion for enhancing the exposure time between the materials and for promoting infiltration of at least one of the materials with at least another one of the materials. Such a configuration may be advantageous for enabling a bundle of continuous filaments to be infiltrated with a matrix material to form a deposition material with improved strength or other property, such as a fiber reinforced matrix composite material, for example.

On the other hand, when the sleeve is in the second position, the at least two materials may interface and combine with each other further downstream nearer to the point of extrusion for reducing the exposure time between the materials and for promoting encapsulation of at least one of the materials with at least another one of the materials. Such a configuration may be advantageous for enabling a continuous filament to be encased within another material to form a deposition material with improved insulation of the continuous filament, or other property, such as an electrical fiber or optical fiber that is jacketed with insulation, for example.

According to an aspect of the invention, a material deposition system for additive manufacturing includes an extruder that defines a first input passage for supplying a first material, a second input passage for supplying a second material, and a chamber for combining the first material and the second material to form a combined deposition material; a sleeve within the chamber, the sleeve being movable between a first position and a second position to vary the exposure time of the second material with the first material based on the position of the sleeve within the chamber; and an extrusion port for extruding the combined deposition material.

Embodiments of the invention may include one or more of the following additional features separately or in combination.

For example, the sleeve may be configured to separate the first material from the second material in the chamber.

The sleeve may define an internal sleeve passage for passing the first material through the chamber toward an outlet of the sleeve, thereby enabling the first material to be exposed to the second material when the first material exits through the outlet of the sleeve.

The sleeve may have an outer surface that is spaced apart from an inner surface defining the chamber to form an annulus therebetween. The annulus may be configured to enable the second material to pass through the chamber toward the outlet of the sleeve, thereby enabling the first material to be exposed to the second material when the first material exits through the outlet of the sleeve.

The outlet of the sleeve may be located further upstream from the extrusion port when the sleeve is in the first position compared to the second position, thereby enabling enhanced exposure time between the first material and the second material for promoting infiltration of the second material in the first material.

The outlet of the sleeve may be located nearer to the extrusion port when the sleeve is in the second position compared to the first position, thereby enabling reduced the exposure time between the first material and the second material for promoting encapsulation of the first material within the second material.

The first material may include a bundle of continuous filaments and the second material may include a flowable material. When the sleeve is in the first position, the flowable material may have sufficient exposure time with the bundle of continuous filaments to infiltrate into the bundle as a matrix phase prior to extrusion to form the combined deposition material as a filament reinforced matrix composite material.

The first material may include at least one continuous filament and the second material may include a flowable material. When the sleeve is in the second position, the flowable material may interface with the at least one continuous filament to encase a peripheral portion of the filament prior to extrusion to form the combined deposition material as a jacketed filament material.

The first material may include a first flowable material and the second material includes a second flowable material. When the sleeve is in the first position, the second flowable material may have sufficient exposure time with the first flowable material to infiltrate and blend into the first flowable material to form the combined deposition material as a blended deposition material.

The sleeve may be located in various other positions between or beyond the first position and the second position.

For example, the sleeve may be located in a third position that enables the first material to pass through the extrusion port, but restricts the second material from passing through the extrusion port, or vice versa.

The sleeve may be coaxially disposed within the chamber.

The sleeve may have an interchangeable nozzle at the outlet of the sleeve.

The extruder may have an interchangeable nozzle at the extrusion port.

The interchangeable nozzle of the sleeve may be configured to cooperate with the interchangeable nozzle of the extruder for varying the configuration of the first material compared to the configuration of the second material in the combined deposition material.

The material deposition system may further include an actuator for moving the sleeve axially within the chamber between the first position and the second position.

The material deposition system may further include a cutting device for severing at least one of the first material, the second material, and the combined deposition material during extrusion thereof.

The material deposition system may further include one or more heaters for heating at least one of the first material, the second material, and the combined deposition material.

The material deposition system may further include a controller for controlling the position of the sleeve in the chamber, among other parameters.

According to another aspect of the invention, a material deposition system for additive manufacturing includes an extruder that defines a first input passage for supplying a first material, a second input passage for supplying a second material, a chamber for combining the first material and the second material to form a combined deposition material, and an extrusion port for extruding the combined deposition material; and an adjustable sleeve within the chamber, the sleeve being adjustable between a first position and a second position within the chamber for varying the point at which the first and second materials interface with each other within the chamber, the first position being further upstream from the extrusion port than the second position.

According to another aspect of the invention, a method of additive manufacturing a three-dimensional article includes: (i) supplying a first material and a second material to a chamber in an extrusion head; (ii) adjusting a movable sleeve between a first position and a second position within the chamber to vary the exposure time of the second material with the first material based on the position of the sleeve in the chamber; (iii) combining the first material and the second material to form a combined deposition material; and (iv) extruding the combined deposition material through an extrusion port of the extrusion head.

Embodiments of the invention may include one or more of the following additional features separately or in combination.

The supplying the first material may include feeding the first material through an internal passage defined by the sleeve.

The combining may include feeding the first material through an outlet defined by the sleeve and exposing the first material to the second material.

The supplying the second material may include feeding the second material through an annulus defined by an outer surface of the sleeve and an internal surface defining the chamber.

The combining may include feeding the second material through the annulus toward the outlet defined by the sleeve thereby exposing the first material to the second material.

The adjusting may include moving the sleeve to the first position such that the outlet of the sleeve is located further upstream from the extrusion port compared to the second position, thereby enhancing the exposure time between the first material and the second material and promoting infiltration of the second material in the first material.

The adjusting may include moving the sleeve to the second position such that the outlet of the sleeve is located further downstream nearer to the extrusion port compared to the first position, thereby reducing the exposure time between the first material and the second material and promoting encapsulation of the first material within the second material.

The supplying the first material may include supplying one or more continuous filaments.

The supplying the second material may include supplying a flowable material.

The adjusting may include moving the sleeve to the first position such that the flowable material has sufficient exposure time with the one or more continuous filaments to infiltrate the one or more continuous filaments to form the combined deposition material.

The adjusting may include moving the sleeve to the second position such that the flowable material has limited exposure time with the one or more continuous filaments to encase the one or more continuous filaments to form the combined deposition material.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

DETAILED DESCRIPTION

The aspects and principles of the present invention have particular application to material deposition systems for additive manufacturing via fused-filament fabrication (FFF), also referred to as fused-deposition modeling (FDM), and thus will be described below chiefly in this context. It is also understood, however, that the aspects and principles of the present invention may be applicable to other material deposition systems where it is desirable to vary the interaction between two or more materials in an extrusion head prior to deposition.

Figures 1, 2:
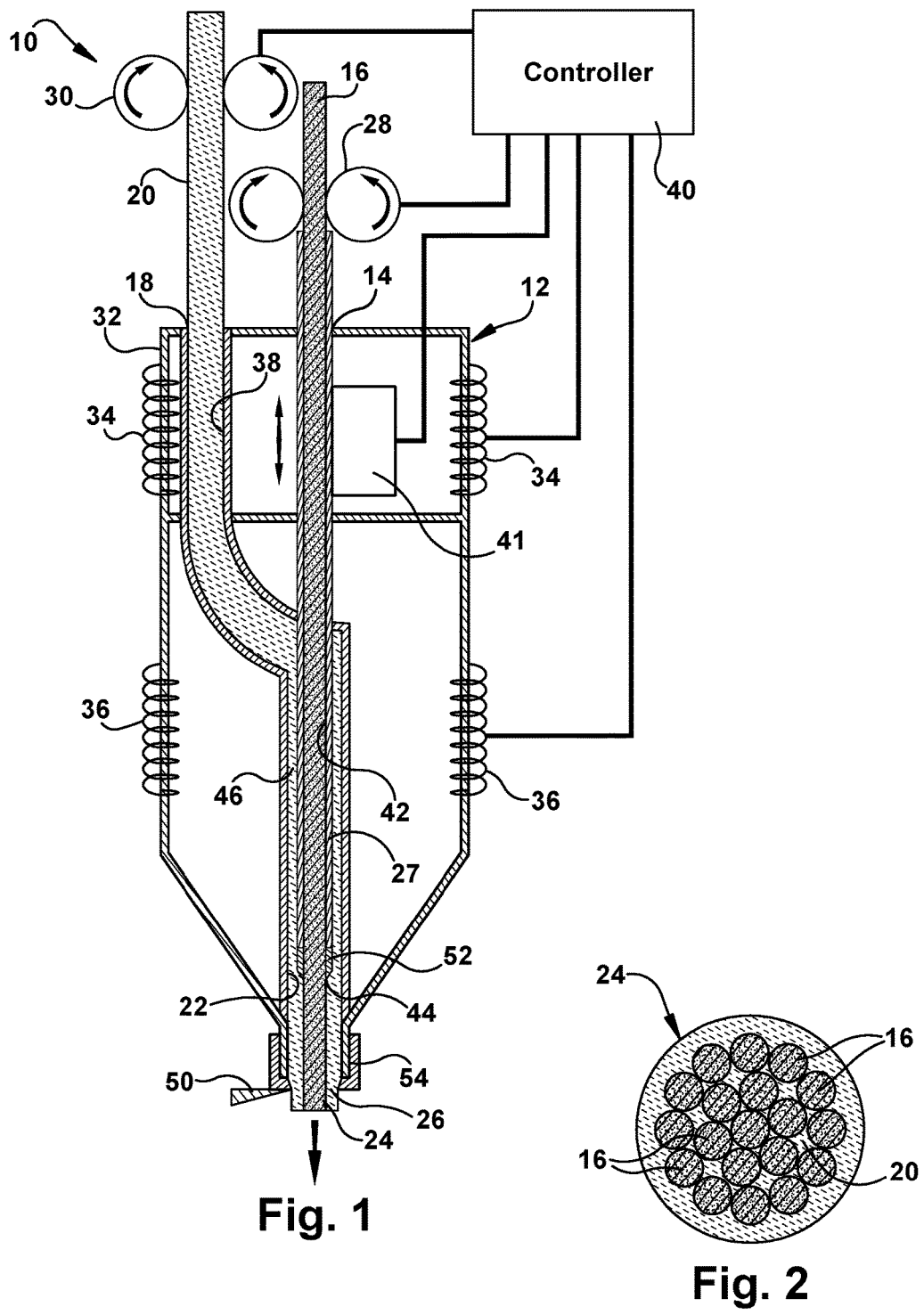
FIG. 1 is a schematic view of an exemplary material deposition system according to an embodiment of the invention, including a cross-sectional view of an exemplary extruder having an adjustable sleeve in an exemplary first position.
FIG. 2 is a schematic cross-sectional view of an exemplary material deposited from the extruder as configured in FIG. 1.

Referring to FIG. 1, an exemplary material deposition system 10 is shown. Generally, the material deposition system 10 includes an extruder 12, a first input passage 14 for supplying a first material 16 to the extruder 12, a second input passage 18 for supplying a second material 20 to the extruder 12, and a chamber 22 for combining the first material 16 and the second material 20 to form a combined deposition material 24. An extrusion port 26 is located downstream from the chamber 22 and is configured to extrude and thereafter deposit the combined deposition material 24 to additively manufacture a three-dimensional article. The exemplary material deposition system 10 further includes an adjustable sleeve 27 that is configured to vary the interaction between the materials 16, 20 in the chamber 22. For example, as discussed in further detail below, the adjustable sleeve 27 may be configured to separate the first material 16 and the second material 20 in the chamber 22, and can vary the point at which the materials 16, 20 interface with each other prior to deposition based on the sleeve position.

The material deposition system 10 may be included as part of an additive manufacturing apparatus (not shown), which may have a frame, a build platform, a vertical motion (Z) drive system, a lateral motion (Y) drive system, and an orthogonal lateral motion (X) drive system. The build platform may be movable relative to the frame via the Z drive and Y drive, and the extruder 12 (also referred to as an extrusion head) may be movable relative to frame via the X drive. Many other configurations are possible including exemplary systems in which the build platform is stationary and the extrusion head moves in two or three drive axes. In other exemplary embodiments, multiple extruders may be provided to simultaneously deposit multiple combined deposition materials. Generally, the exemplary material deposition system 10 as described herein may be applicable to nearly any additive manufacturing system that uses material feedstock fed through conduits or passages. As such, the exemplary material deposition system may be used for additively manufacturing via layerwise deposition, such as fused filament fabrication, or other suitable additive manufacturing techniques, which can be chosen based on the materials, tolerances, size, quantity, accuracy, cost structure, critical dimensions, and other parameters defined by the system requirements or the requirements of the three-dimensional article to be made.

As shown in FIG. 1, the material deposition system 10 may include one or more actuators 28, 30 associated with each of the first material 16 and the second material 20 for supplying (e.g., feeding or dragging) the respective materials 16, 20 (e.g., input or feed materials) through the input passages 14, 18 toward the chamber 22. In exemplary embodiments, the input passages 14, 18 may be defined by a manifold 32 of the extruder 12. The one or more actuators 28, 30 may include motors, such as stepper motors, which may be selected in a suitable manner well-known in the art. The respective actuators 28, 30 may be independently controlled to convey the respective materials 16, 20 from a spool or other supply through the input passages 14, 18 and downstream toward the chamber 22 with prescribed feed forces or feed rates that may be selected or adjusted depending on the system requirements. It is understood that although only two different actuators 28, 30 associated with the respective feed materials 16, 20 are shown, other numbers of different materials, input passages, and actuators are also possible. For example, systems with 3, 4, 5, 6 or more different materials, input passages, and actuators are equally feasible.

The material deposition system 10 also may include (or may be in thermal communication with) one or more heating elements 34 configured to heat and/or liquefy one or more of the input materials 16 and/or 20. As used herein, the term "liquefied" or "liquefication" includes heating to a temperature, or maintaining at a temperature, above the melting point (or glass transition temperature) of the material being heated for effecting a flowable or fluid state of the material. The extruder 12 may include one or more liquefication passages 38 associated with each of the input passages 14, 18, and each liquefication passage may be in thermal communication with a corresponding heating element 34. The liquefication passages may be coextensive with the chamber 22, or the liquefication passages may extend beyond the chamber 22 and connect with the input passages 14, 18 such that the feed materials 16, 20 are likely to be liquefied before they enter the chamber 22. Alternatively or additionally, the extruder 12 may include a heating element 36 in thermal communication with the chamber 22 for heating and/or further liquefying one or more of the feed materials 16, 20 as they enter the chamber 22, or for heating the combined deposition material 24 to a prescribed temperature before being extruded.

The material deposition system 10 also may include a controller 40, which may be configured to control one or more parameters associated with the feed materials 16, 20 and/or the combined deposition material 24. The controller 40 may receive instructions according to a model of the three-dimensional article to be formed, and may also receive feedback from sensors or other devices for verifying and adjusting the control of such parameters. For example, the controller 40 may be operatively coupled to the actuators 28, 30 for independently controlling the feed rate or feed force of each of the feed materials 16, 20 through the extruder 12. The controller 40 also may be operatively coupled to the one or more heating elements 34, 36 for independently controlling the temperature of the feed materials 16, 20 and/or the combined deposition material 24, such as for achieving a desired viscosity of the respective materials. Optionally, the controller 40 may be operatively coupled to a cooling means, such as active thermoelectric cooling or heat exchanger, for controlling temperature of the feed materials 16, 20 and/or the combined material 24 in a similar manner. Optionally, the controller 40 also may be operatively coupled to a flow control device, such as a valve at the extrusion port 26, for controlling the flow rate of the material being extruded. As discussed in further detail below, the controller 40 also may be operatively coupled to the adjustable sleeve 27 (such as via an actuator 41) for controlling the position of the sleeve 27 within the chamber 22. It is understood that other parameters other than those described above also may be controlled by the controller 40, as would be understood by those having ordinary skill in the art.

Still referring to FIG. 1, the adjustable sleeve 27 is shown disposed within the chamber 22 in an exemplary first position. As shown in the illustrated embodiment, the adjustable sleeve 27 is configured to separate the first material 16 from the second material 20 in the chamber 22 so as to control the interaction between the materials 16, 20. For example, the sleeve 27 may define an internal sleeve passage 42 extending along a longitudinal axis of the chamber 22 for passing the first material 16 through the chamber 22 toward a sleeve outlet 44. In exemplary embodiments, the sleeve outlet 44 may be disposed at an axial end of the sleeve 27, as shown, however other locations of the sleeve outlet 44 are also possible. Also as shown, the adjustable sleeve 27 may be disposed coaxially within the chamber 22, and an outer surface of the sleeve 27 may be spaced apart from a chamber inner surface to form an annulus 46 therebetween. The annulus 46 may be configured to enable the second material 20 to pass downstream through the chamber 22 separated from the first material 16 until reaching the sleeve outlet 44, whereby the first material 16 may interact with the second material 20 as the first material 16 exits through the sleeve outlet 44. In this manner, based upon a position of the sleeve 27 within the chamber, the point at which the materials 16, 20 interact with each other in the chamber may vary, which may vary the exposure time between the materials prior to deposition, and which may also enable a varying degree of infiltration, encapsulation, or other interaction between the materials.

In exemplary embodiments, when the sleeve 27 is in the first position (as shown in FIG. 1), the sleeve outlet 44 may be spaced a sufficient distance away from the extrusion port 26 such that the two materials 16, 20 may interface and combine with each other further upstream in the chamber 22. Such a configuration may enhance the exposure time between the materials 16, 20 before deposition, and this enhanced exposure time may enable the second material 20 to sufficiently infiltrate or blend into the first material 16 when forming the combined deposition material 24.

Turning to FIG. 2, a cross-sectional view is shown of the exemplary combined deposition material 24 that may be formed when the sleeve 27 is in the first position. In the illustrated embodiment, the first material 16 may include one or more filaments, such as a bundle of continuous fiber filaments, or fiber tow, for example. The second material 20 may include a flowable material that may be subsequently hardened or cured during or after deposition, such as a thermally liquefiable polymer, for example. As shown, when the sleeve 27 is in the first position, the flowable material (e.g., second material 20) has sufficient exposure time with the bundle of continuous filaments (e.g., first material 16) so as to infiltrate into the filament bundle prior to extrusion to form the combined deposition material 24 as a fiber reinforced composite deposition material. In this manner, the flowable matrix material (e.g., second material 20) may have sufficient viscosity or other property to infiltrate the void space between the fibers and "wet out" the individual fibers in the bundle. Such a combined material may have a substantially continuous, void-free matrix phase that may act to transfer loads to the fibers, and may protect the fibers from abrasion and/or environmental attack, among other considerations.

Such an exemplary configuration of the material deposition system 10 described above may be advantageous for additively manufacturing three-dimensional composite structures. For example, the direction of the fiber reinforced material deposited during the additive manufacturing process may be controlled within specific layers or portions of layers of the three-dimensional article. Such directional control of the fibers may be used to control the directional strength, thermal or electrical conductivity, or other property of the composite structure, both locally and overall. In addition, the ability to adjust the sleeve 27 for controlling the interaction between the materials 16, 20 may enable further modification of such properties of the three-dimensional composite structure, both locally and overall as well. For example, by adjusting the position of the sleeve 27 and the exposure time between the materials 16, 20, the degree of infiltration of the matrix material (e.g., second material) into the fiber bundle (e.g., first material) may be adjusted for enhancing or reducing such properties as strength, thermal or electrical conductivity, or other properties. In this manner, both the directional control of depositing the reinforced material, as well as the interaction between the materials by adjusting the sleeve, can provide enhanced or reduced properties within the additively manufactured structure, which may be modified in desired locations and directions to meet specific design requirements. It is understood that the foregoing example is for illustration, not limitation. It is also understood that the exemplary material deposition system may provide such advantages while additively manufacturing a single part, or may provide such advantages while additively manufacturing from part-to-part, all while using the same extruder head.

Figure 3:
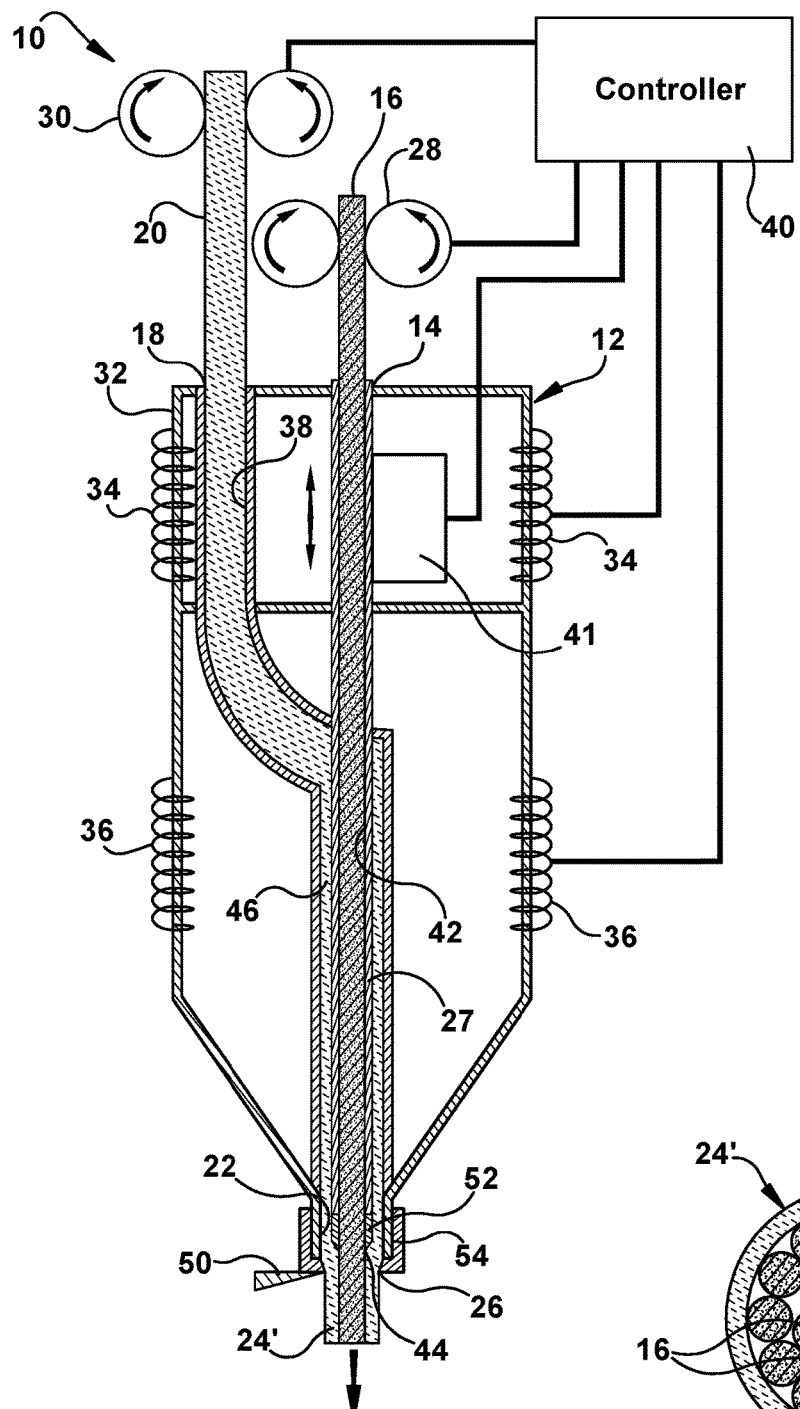
FIG. 3 is a schematic view of the material deposition system in FIG. 1, including the exemplary extruder having the adjustable sleeve in an exemplary second position.

Turning to FIG. 3, the adjustable sleeve 27 is shown disposed within the chamber 22 in an exemplary second position. The actuator 41, such as a stepper motor, may be configured to move the sleeve 27 axially within the chamber 22 from the first position (FIG. 1) to the second position (FIG. 3) such that the sleeve outlet 44 moves further downstream closer to the extrusion port 26 in the second position. By locating the sleeve outlet 44 nearer to the extrusion port 26 in this manner, the first material 16 may be separated from the second material 20 a further distance along the axial length of the chamber 22, such that the two materials 16, 20 do not interface and combine with each other until further downstream in the chamber 22. Such a configuration may thereby reduce the exposure time between the materials 16, 20 before deposition, and this reduced exposure time may reduce infiltration between the materials 16, 20, and may instead promote the second material 20 to encapsulate or jacket the first material 16 to form another exemplary combined deposition material 24'.

Figure 4:
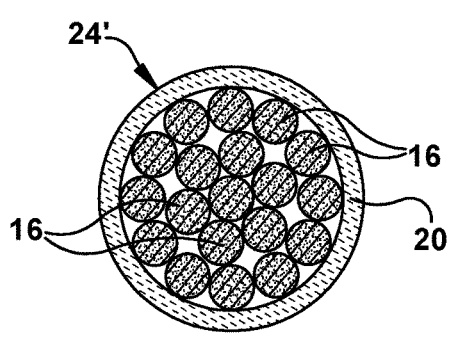
FIG. 4 is a schematic cross-sectional view of an exemplary material deposited from the extruder as configured in FIG. 3.

Referring to FIG. 4, a cross-sectional view is shown of the combined deposition material 24' that may be formed when the sleeve 27 is in the second position. In the illustrated embodiment, the first material 16 may include one or more filaments, such as a bundle of continuous fiber filaments, for example. The second material 20 may include a flowable material that may be subsequently hardened or cured during or after deposition, such as a thermally liquefiable polymer, for example. As shown, when the sleeve 27 is in the second position, the flowable material (e.g., second material 20) has limited exposure time with the bundle of continuous filaments (e.g., first material 16) and does not substantially infiltrate into the filament bundle prior to extrusion, but may instead encase a periphery of the filament bundle just prior to extrusion so as to form the combined deposition material 24' as a jacketed filament material. In this manner, the flowable jacket material (e.g. second material 20) may have sufficient viscosity or other property to encase the fiber bundle to provide a substantially continuous, void-free phase that may insulate the fibers and/or protect the filaments from environmental attack, but may still allow the individual fibers within the bundle core to interact with one another. It is understood that although the second material 20 may coaxially encase the first material 16, as shown, at least some infiltration of the second material 20 into the filament bundle (e.g., first material 16) may still occur around the peripheral portion of the bundle.

Such an exemplary configuration of the material deposition system 10 described above may be advantageous for selectively providing electrical, optical, and/or fluid communication paths within or throughout an additively manufactured three-dimensional object. For example, the deposition of continuous electrically conductive paths may be used as electrical traces, antennas, wiring, or other suitable components. Optical communication lines may be used for optical sensors or information transmission lines. Fluid communication lines may be used as fluid passages to various other parts of the structure, or may be used as heat exchangers, among other functions.

In addition, the ability to adjust the sleeve 27 for controlling the interaction between the materials 16, 20 may enable further modification of such properties of such communication paths within the additively manufactured structure, both locally and overall. For example, if the first material 16 includes a plurality (e.g., bundle) of continuous electrically conductive wires, and the second material 20 includes an insulative material, then the sleeve 27 may be adjusted toward the second position to jacket and insulate the bundle of electrically conductive wires to provide a suitable electrical communication path. On the other hand, if the sleeve 27 is adjusted toward the first position, then the insulative material (e.g., second material 20) may infiltrate into the bundle of electrical wires (e.g., first material 16), thereby insulating individual wires and reducing the electrical conductivity or interrupting the electrical communication path. Optionally, if the sleeve is adjusted toward a third position (not shown), for example a position lower than the second position in the illustrated embodiment of FIG. 3, whereby the annulus 46 is blocked from allowing flow of the second material 20 through the extrusion port 26, then only the electrically conductive wires (e.g., first material 16) may be deposited in the three-dimensional structure, which could enable these exposed portions of wire (without insulation) to be used as externally addressable contact points along the electrical communication path within the structure. The foregoing example is for illustration, not limitation, and it is understood that the exemplary material deposition system may enhance, reduce, or otherwise vary the properties of electrical, thermal, optical, fluid, or other communication as desired to meet specific design requirements, both within a single part, as well as such differences from part-to-part, all while using the same extruder head, for example.

In exemplary embodiments, the adjustable sleeve 27 may be positioned within the chamber 22 at any point between the first position (FIG. 1) and the second position (FIG. 3), or even an optional third position (discussed above), which may be selected in a suitable manner depending on the materials used and the desired three-dimensional article to be formed. In some embodiments, the sleeve 27 may be adjusted during the additive manufacturing of a single article to enhance the tailorability and flexibility in design of such an article, as discussed above. In other embodiments, the sleeve 27 may be fixed in its position during the additive manufacturing of a single three-dimensional article, and thereafter the sleeve may be adjusted for additively manufacturing subsequent different articles so as to enable those different articles to be formed with different features based on the position of the sleeve, as discussed above. Such a material deposition system may therefore enable such different articles to be formed with the same extrusion head, which may improve the flexibility of the additive manufacturing process, while reducing the manufacturing costs that would otherwise be associated with requiring multiple different extrusion heads and multiple different types of specially compounded input materials, among other considerations.

It is understood that the foregoing description is not limited to the materials 16, 20 described above; rather such materials may be selected to cooperate with each other in a suitable manner depending on the desired features of the three-dimensional object to be formed.

In exemplary embodiments, the first material 16 may include materials that impart such properties as structural (e.g., strength), vibrational (e.g., damping), insulative (e.g., electrical and/or thermal), conductive communication (e.g., electrical and/or thermal), optical communication, fluid communication (e.g., gas or liquid), and/or other properties. Further, multiple types of materials may be used in the first material, such as multiple types of continuous filaments, which may provide multiple functionalities, such as both electrical and optical properties. Such materials may include, but are not limited to: carbon fibers, ceramic fibers, aramid fibers, fiberglass, metal fibers (such as copper, silver, gold, tin, steel), optical fibers, hollow tubes, or other similar materials. Optionally, such continuous filaments of the first material 16 may be pre-infiltrated with a resin or matrix material, such as in towpreg form, prior to supplying the first material 16 to the extruder 12, which may assist in the second material 20 blending with the matrix of the first material, or the second material encapsulating the first material.

The first material 16 also may include one or more polymer filaments, which may be infiltrated or blended with the second material 20 to form a blended deposition material, the composition of which may be dependent on the exposure time between the two materials 16, 20 and optionally the temperatures and/or viscosity of the respective materials. Such polymer filaments may include polyethylene (PE), High Density polyethylene (HDPE), Ultra High Density polyethylene (UHDPE), Acrylonitrile butadiene styrene (ABS), Polypropylene (PP), Polydimethyl siloxane (PDMS), Polyoxymethylene (POM), Polyethylene terephthalate (PET), Polyetheretherketone (PEEK), Polyamide (PA), Polysulphone (PS), Polyphenylene sulphide (PPS), Polyphenylsulfone (PPSF), Polytetrafluoroethylene (PTFE), polyvinylidene fluoride (PVDF), or other similar polymers.

In exemplary embodiments, the second material 20 may include a flowable material, such as a dispersion, paste, or a thermally liquefiable polymer or resin, which may solidify and/or cure when deposited. For example, the second material 20 may include an acid-, base- or water-soluble polymer, acrylonitrile-butadiene-styrene terpolymer (ABS), polycarbonate (PC), poly(meth)acrylate, polyphenylene sulfone (PPSU), polyethylene (PE), high-density polyethylene (HDPE), polyetherimide (PEI), polyetheretherketone (PEEK), polylactic acid (PLA), epoxy, vinyl, nylon, phenolic, or other similar polymer.

One or more additional materials also may be provided, either separately or in combination with the first material 16 and/or the second material 20. For example, the additional material may include any of the foregoing types of materials, or may include different types of constituents for being combined in the first or second material, such as elastomers (e.g., rubber), harder materials (e.g., ceramics or materials having a Mohs' hardness of five or greater), softer materials (e.g., minerals or materials having a Mohs' hardness of less than five), conductive materials (e.g., metals, carbons, graphites, graphene, carbon nanotubes, etc.), reinforcing materials (e.g., fibrous materials, such as chopped carbon fiber or fiberglass), fluxes, lubricants, plasticizers, pigments (e.g., colorants), fillers, and/or other additives.

Referring again to FIG. 1 and FIG. 3, the exemplary material deposition system 10 also may include a cutting mechanism 50. The cutting mechanism 50 may be configured to provide selective termination of the combined deposition material 24 so as to deposit a desired length of the material 24, which otherwise may not easily be terminated if the deposited material were still connected to the input material within the extrusion head, such as with a continuous filament or fiber, for example. The cutting mechanism 50 may be operatively connected to the controller 40, and may be operable to terminate the combined deposition material 24 via shearing, such as with a blade, or other suitable method. In the illustrated embodiment, the cutting mechanism 50 is located at the outlet of extrusion port 26, but may be located further upstream or further downstream from the extrusion port as desired.

The material deposition system 10 also may include an interchangeable sleeve nozzle 52 disposed at the outlet 44 of the sleeve 27. The sleeve nozzle 52 may be configured to change the size and/or shape of the first material 16 exiting the sleeve 27, as well as change the size and/or shape of the annulus 46, which may change the interaction of the second material 20 with the first material 16, and which may thereby further enhance the tailorability of the article to be formed. In exemplary embodiments, the nozzle 52 may be changed in a quick-release fashion by axially moving the sleeve 27 toward the extrusion port 26 to a position in which the nozzle 52 extends outside beyond the extrusion port 26. Optionally, the controller 40 may determine when the nozzle 52 is to be changed depending on the build instructions of the additively manufactured object to be formed. The nozzle 52 may include such shapes as circular, oval, polygonal, or other shapes. Optionally, the nozzle 52 may be a dynamic nozzle capable of adjusting its size and/or shape during the additive manufacturing process.

The material deposition system 10 may further include an interchangeable extrusion nozzle 54 disposed at the outlet of the extruder 12, which may define the extrusion port 26. The extrusion nozzle 54 may be configured to change the size and/or shape of the second material 16 exiting the chamber 22, and optionally may be used as a flow control device. The extrusion nozzle 54 also may be configured to cooperate with the sleeve nozzle 52 to vary the interaction, size, shape, form, etc. of the second material 20 with the first material 16, which may thereby further enhance the tailorability of the article to be formed. In exemplary embodiments, the nozzle 54 may be changed in a quick-release fashion, and optionally the controller 40 may receive build instructions to determine when to change the configuration of the nozzle 54. The nozzle 54 may include such shapes as circular, oval, polygonal, or other shapes. Optionally, the nozzle 54 may be a dynamic nozzle capable of adjusting its size and/or shape during the additive manufacturing process.

In exemplary embodiments, the adjustable sleeve 27 also may be interchangeable. For example, different sleeve configurations may be used to vary the size and/or shape of the sleeve passage 42 and/or the annulus 46, which may vary the flow rate or other interaction of the materials 16, 20 within the chamber 22. For example, different sleeve configurations may be used to make the sleeve more thermally conductive (such as via a metal sleeve) so as to promote heating of the first material 16 within the sleeve 27. On the other hand, different sleeve configurations may be used to make the sleeve less thermally conductive (such as a ceramic sleeve, or a sleeve having active cooling channels therein) so as to reduce heating of the first material 16 within the sleeve 27. In exemplary embodiments, the sleeve 27 may be changed in a quick-release fashion, and optionally the controller 40 may receive build instructions to determine the desired configuration of the sleeve 27 during, before or after the additive manufacturing process.

Figure 5:
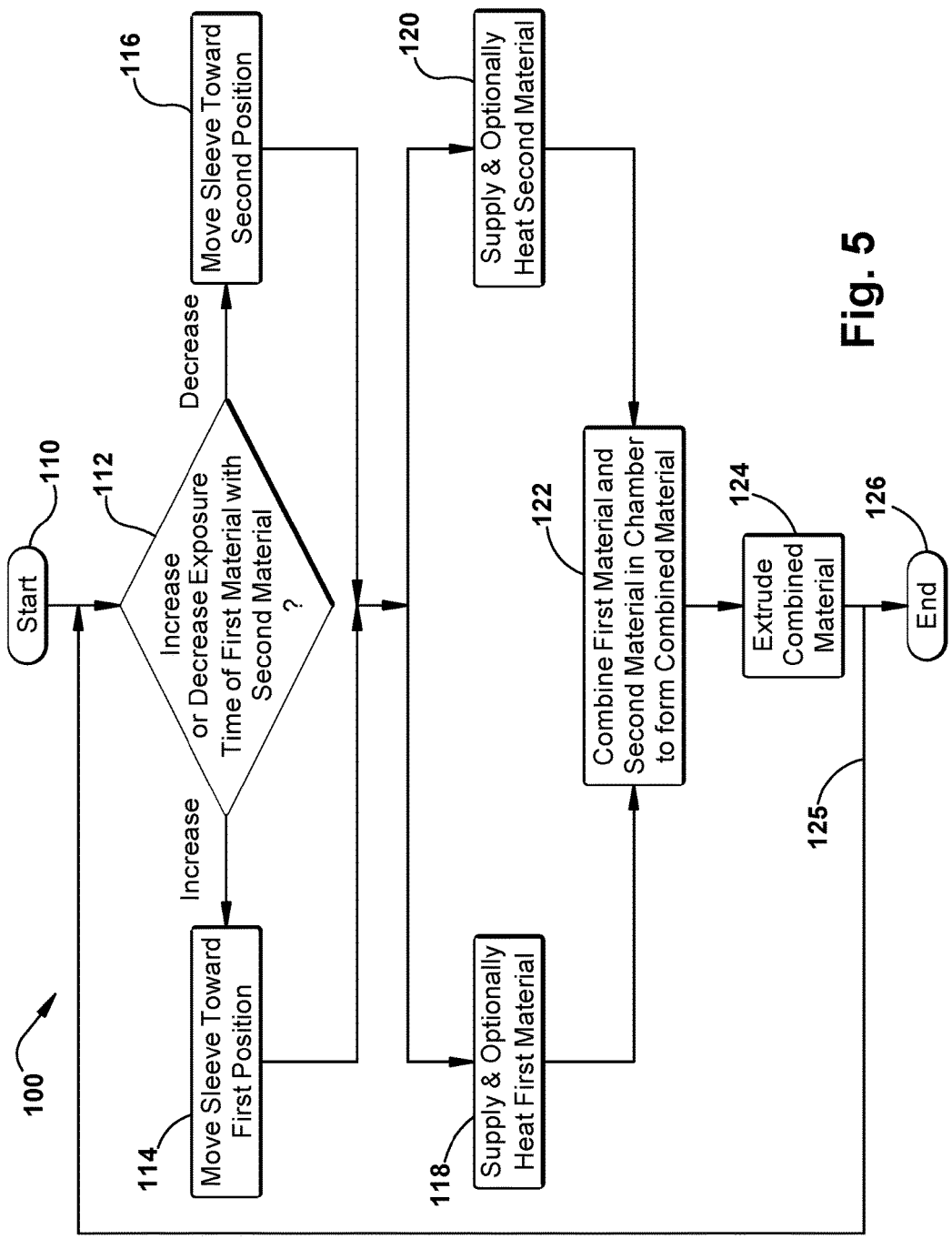
FIG. 5 is a flow-diagram of an exemplary process for additively manufacturing a three-dimensional object according to an embodiment of the invention.

Turning to FIG. 5, a flow-chart of an exemplary basic operation 100 of the material deposition system for additively manufacturing a three-dimensional object is shown. The method may begin before step 110 by configuring a model for the object and/or fabrication instructions for the object to be additively manufactured. The object model may be any computer-readable file or files on a non-transitory computer readable medium that collectively specify the structure, materials, and/or other features of the object. This may, for example include CAD files, STL files, and the like that provide three-dimensional descriptions of the object. Fabrication instructions corresponding to a model may be any collection of instructions that, when carried out by an additive manufacturing apparatus or three dimensional printer, result in the fabrication of the object. For example, fabrication instructions may include a series of instructions for moving to various x,y,z coordinates and controlling temperature, feed rate, feed pressure, flow rate, etc. of the input or output materials, as well as the sleeve position, or other desired parameters. The process 100 may be carried out using suitable digital electronic circuitry, or computer software, firmware, or hardware, as understood by those having skill in the art. For example, during the extrusion and deposition process, the material deposition system 10 may receive fabrication instructions from a controller (e.g., controller 40) according to the previously described model.

As shown at step 112, a decision is made whether to increase or decrease the exposure time of the first material with the second material. The controller may determine whether to make such an adjustment depending on the build instructions from the model, for example, or by monitoring other system conditions. The process may be accomplished as described above, such as by adjusting the position of the adjustable sleeve within the chamber to vary the position at which the two materials interface in the chamber upstream from the extrusion port. For example, if the exposure time is to be increased, the process may proceed to step 114 where the adjustable sleeve is moved toward a first position, which may be further upstream from the extrusion port to enhance the exposure time between the two materials before being extruded. On the other hand, if the exposure time is to be decreased, then the process may instead proceed to step 116 where the adjustable sleeve is moved toward a second position, which may be further downstream nearer to the extrusion port compared to the first position, so as to reduce the exposure time between the two materials before being extruded. Based on the position of the sleeve within the chamber, the interaction between the two (or more) materials may be altered, as discussed above. In the illustrated embodiment, steps 112, 114 and 116 are shown as occurring before supplying the first and second materials at steps 118 and 120, respectively. However, it is understood that steps 112, 114 and 116 may also be accomplished further downstream in the process, such as after the first and second materials are supplied, or even after the combined deposition material has been deposited. It is further understood that one or more of the steps 112 to 125 may be performed simultaneously or in conjunction with one another, or consecutively and separately from each other, as desired.

At steps 118 and 120, the first material and the second material may be independently supplied to the extruder, such as via the input passages in the manner previously described. During the supplying of the first and second materials, the extruder may be moveable in x,y,z coordinates relative to a build platform. The first material and/or the second material may be supplied to the respective input passages in solidified form, and thereafter optionally may be heated and/or liquefied into a flowable or fluid state having suitable viscosity in the manner(s) described above. For example, the heaters which are in thermal communication with the first material and/or the second material may be configured to heat and/or maintain the temperature of these materials, for example, to a temperature above the melt temperature (or glass transition temperature) of the material(s) to be heated. The temperature of the first and second materials may be independently controlled by the controller and by respective heating elements for being heated to the same temperature or different temperatures with respect to each other. After the first and second materials have been supplied to the respective input passages and optionally heated, the first and second materials may each be supplied to the chamber of the extruder in the manner(s) described above. For example, the first material may be supplied to the chamber via the internal sleeve passage, and the second material may be supplied to the chamber separated from the first material via the annulus between the outer sleeve surface and the chamber inner surface. Optionally, the first and second materials may continue to be heated while in the chamber. The first and second materials may be supplied simultaneously or consecutively toward the chamber, and the feed rate of these materials may be supplied at the same feed rate or different feed rates with respect to each other, all of which may be independently controlled by the controller and respective feed actuators, as described above.

At step 122, the first material and the second material are combined to form the combined deposition material, such as in the manner(s) described above. For example, if the sleeve is in the first position, or an intermediate position toward the first position, the sleeve outlet may be disposed far enough away from the extrusion port such that the two materials may interface and combine with each other further upstream in the chamber, which may enhance the exposure time between the materials before deposition, and which may enable the second material to sufficiently infiltrate or blend into the first material when forming the combined deposition material. On the other hand, if the sleeve is in the second position, or an intermediate position toward the second position, the sleeve outlet may be disposed close enough to the extrusion port such that the two materials may interface and combine with each other further downstream in the chamber, for example at or just prior to the extrusion port, which may reduce the exposure time between the materials before deposition, and which may promote encapsulation of the first material by the second material to form a different combined deposition material, such as described above.

At step 124, the combined deposition material is extruded through the extrusion port. The process may continue after step 124, where after extruding the combined deposition material from the extrusion head, the material may be deposited as a continuous fluid or semi-fluid stream onto a base member or build platform positioned proximal the extrusion port or nozzle of the extruder. Simultaneously with the dispensing of the material onto the base member, the base member and/or the extrusion head may be mechanically moved with respect to each other in a predetermined pattern to form a first layer of the deposited material on the base member. Thereafter, the extrusion head may be displaced by a predetermined layer thickness distance from the first layer, and after the portion of the first layer adjacent the nozzle has cooled and/or solidified, a second layer of the material in a fluid or semi-fluid state may be dispensed onto the first layer from the extrusion port while simultaneously moving the base member and the extrusion head relative to each other, whereby the second layer cools and/or solidifies and adheres to the first layer to form a three-dimensional article. In this manner, multiple layers of the deposited material may be formed by being built up on top of each other in multiple passes by repeated dispensing of the desired material.

Optionally, before the process ends at step 126, the controller may receive feedback from one or more sensors associated with one or more process parameters (e.g., feed rate, feed pressure, temperature, sleeve position, flow rate, etc.) and the controller may adjust such parameters in a feedback loop to achieve the desired setpoint according to the build instructions. Optionally, another sensor, such as an optical or acoustic sensor, or other similar non-destructive inspection device, may be provided to determine whether the combined deposition material as deposited meets desired build criteria (e.g., amount of matrix material infiltrated into the fiber bundle, etc.) and the controller may adjust one or more parameters (e.g., temperature, sleeve position, feed rate, etc.) in a feedback loop to achieve the desired build criteria according to the build instructions. Optionally, after a portion of the three-dimensional article has been formed via extruding the combined material in step 124, the build instructions may include a feedback loop 125 to determine if further adjustments to increase or decrease the exposure time are desired. The process may end at step 126, for example, when the three-dimensional article has been fully formed by the exemplary process using the exemplary material deposition system.

An exemplary material deposition system and additive manufacturing process has been described herein in which the interaction between two or more input materials may be controlled within a chamber of an extruder. In exemplary embodiments, an adjustable sleeve is disposed within the chamber and may be configured to vary the point at which the materials combine with each other in the chamber, which may enable a varying degree of infiltration, encapsulation, or other interaction between the materials prior to deposition.

It is understood that embodiments of the subject matter described in this specification can be implemented in combination with digital electronic circuitry, or computer software, firmware, or hardware. Embodiments of the subject matter described in this specification can be implemented in an additive manufacturing system that uses one or more modules of computer program instructions encoded on a computer-readable medium for execution by, or to control the operation of, data processing apparatus. The computer-readable medium can be non-transitory, a manufactured product, such as a hard drive in a computer system or an optical disc, or an embedded system. The computer-readable medium can be a machine-readable storage device, a machine-readable storage substrate, a memory device, or a combination of one or more of them. The computer-readable medium can be acquired separately and later encoded with the one or more modules of computer program instructions, such as by delivery of the one or more modules of computer program instructions over a wired or wireless network.

The term "controller" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a run-time environment, or a combination of one or more of them. In addition, the apparatus can employ various different computing model infrastructures, such as web services, distributed computing and grid computing infrastructures.

An "operable connection," or "operative coupling," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors encompass all apparatus, devices, and machines suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented using a computer having a display device, e.g., a CRT (cathode ray tube), LED (light emitting diode), or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:
1. An additive manufacturing apparatus comprising:
a build platform;

an extruder movable relative to the build platform, the extruder defining a first input passage for receiving a first material in filament form, and a second input passage for receiving a second material in filament form;

a first actuator configured to feed the first material in filament form at a first feed rate through the first input passage, and a second actuator configured to feed the second material in filament form at a second feed rate through the second input passage;

one or more heaters located downstream of the first input passage and/or the second input passage, the one or more heaters being configured to heat and/or liquefy the first material and/or the second material;

a chamber within the extruder for combining the first material and the second material to form a combined deposition material;

a sleeve within the chamber, the sleeve being movable within the chamber between a first position and a second position to vary the exposure time of the second material with the first material based on the position of the sleeve within the chamber;

a sleeve actuator operatively coupled to the sleeve, the sleeve actuator being configured to move the sleeve between the first position and the second position;

an extrusion port for extruding the combined deposition material; and a controller operatively coupled to each of the first actuator, the second actuator, the sleeve actuator, the one or more heaters, and to the extruder;

wherein the controller is configured to control the feed rates of the first actuator and the second actuator according to instructions from a computer model;

wherein the controller is configured to control movement of the extruder relative to the build platform for depositing the combined deposition material according to the instructions from the computer model; and wherein the controller is configured to control the sleeve actuator to move the sleeve between the first position and the second position for controlling the exposure time of the second material with the first material according to the instructions from the computer model.

2. The additive manufacturing apparatus according to claim 1, wherein the sleeve is configured to separate the first material from the second material in the chamber, the sleeve defining an internal sleeve passage for passing the first material through the chamber toward an outlet of the sleeve, thereby enabling the first material to be exposed to the second material when the first material exits through the outlet of the sleeve.

3. The additive manufacturing apparatus according to claim 2, wherein the sleeve has an outer surface that is spaced apart from an inner surface defining the chamber to form an annulus therebetween; and wherein the annulus is configured to enable the second material to pass through the chamber toward the outlet of the sleeve, thereby enabling the first material to be exposed to the second material when the first material exits through the outlet of the sleeve.

4. The additive manufacturing apparatus according to claim 3, wherein the outlet of the sleeve is located further upstream from the extrusion port when the sleeve is in the first position compared to the second position, thereby enabling enhanced exposure time between the first material and the second material for promoting infiltration of the second material in the first material.

5. The additive manufacturing apparatus according to claim 4, wherein the outlet of the sleeve is located nearer to the extrusion port when the sleeve is in the second position compared to the first position, thereby enabling reduced the exposure time between the first material and the second material for promoting encapsulation of the first material within the second material.

6. The additive manufacturing apparatus according to claim 4 in combination with the first material and the second material, wherein the first material includes a bundle of continuous filaments and the second material includes a flowable material when heated with the one or more heaters; and wherein, when the sleeve is in the first position, the flowable material has sufficient exposure time with the bundle of continuous filaments to infiltrate into the bundle as a matrix phase prior to extrusion to form the combined deposition material as a filament reinforced matrix composite material.

7. The additive manufacturing apparatus according to claim 5 in combination with the first material and the second material, wherein the first material includes at least one continuous filament and the second material includes a flowable material when heated with the one or more heaters; and wherein, when the sleeve is in the second position, the flowable material interfaces with the at least one continuous filament to encase a peripheral portion of the filament prior to extrusion to form the combined deposition material as a jacketed filament material.

8. The additive manufacturing apparatus according to claim 4 in combination with the first material and the second material, wherein the first material includes a first flowable material when heated with the one or more heaters and the second material includes a second flowable material when heated with the one or more heaters; and wherein, when the sleeve is in the first position, the second flowable material has sufficient exposure time with the first flowable material to infiltrate and blend into the first flowable material to form the combined deposition material as a blended deposition material.

9. The additive manufacturing apparatus according to claim 2, wherein the sleeve has an interchangeable nozzle at the outlet of the sleeve.

10. The additive manufacturing apparatus according to claim 9, wherein the extruder has an interchangeable nozzle at the extrusion port; and wherein the interchangeable nozzle of the sleeve is configured to cooperate with the interchangeable nozzle of the extruder for varying the configuration of the first material compared to the configuration of the second material in the combined deposition material.

11. The additive manufacturing apparatus according to claim 1, wherein the sleeve actuator is configured to move the sleeve axially within the chamber between the first position and the second position.

12. The additive manufacturing apparatus according to claim 1, further including a cutting device for severing the combined deposition material during extrusion thereof.

13. The additive manufacturing apparatus according to claim 2, wherein the extruder includes a liquefication passage coupled to the second input passage for receiving the second material in filament form, the liquefication passage being in thermal communication with the one or more heaters which are configured to heat and liquefy the second material within the liquefication passage upstream of where the second material is exposed to the first material within the chamber, and wherein the feeding of the second material in filament form by the second actuator generates a feed pressure that forces the second material in the liquefaction passage toward the extrusion port.

14. The additive manufacturing apparatus according to claim 1,
wherein the sleeve is movable within the chamber to a third position, in which the first material is not exposed to the second material, such that the first material is extruded via the extrusion port independent of the second material; and
wherein the controller is configured to control the sleeve actuator to move the sleeve between the first position, the second position, and the third position according to the instructions from the computer model.

15. An additive manufacturing apparatus comprising:
an extruder that defines a first input passage for receiving a first material in filament form, a second input passage for receiving a second material in filament form, a chamber for combining the first material and the second material to form a combined deposition material, and an extrusion port for extruding the combined deposition material;
a first actuator configured to feed the first material in filament form at a first feed rate through the first input passage, and a second actuator configured to feed the second material in filament form at a second feed rate through the second input passage;
an adjustable sleeve within the chamber, the sleeve being adjustable between a first position and a second position within the chamber for varying the point at which the first and second materials interface with each other within the chamber, the first position being further upstream from the extrusion port than the second position;
a sleeve actuator operatively coupled to the sleeve, the sleeve actuator being configured to move the sleeve between the first position and the second position; and
a controller operatively coupled to the extruder, the first actuator, the second actuator, and to the sleeve actuator;
wherein the controller is configured to control movement of the extruder along at least an x-y plane according to instructions from a computer model, and is configured to control the feed rates of the first and second actuators according to the instructions from the computer model; and
wherein the controller is configured to control the sleeve actuator to move the sleeve between the first position and the second position according to the instructions from the computer model.

* * * * *